United States Patent [19]

Large et al.

[11] Patent Number: 4,700,222
[45] Date of Patent: Oct. 13, 1987

[54] APPARATUS AND METHOD OF TESTING THE FREQUENCY RESPONSE OF A CABLE TELEVISION SYSTEM

[75] Inventors: David J. Large, Los Gatos; William G. Kostka; Richard A. Wayman, both of San Jose, all of Calif.

[73] Assignee: Gill Industries, Incorporated, San Jose, Calif.

[21] Appl. No.: 739,996

[22] Filed: May 30, 1985

[51] Int. Cl.$^4$ .................. H04N 1/00; H04N 9/64; H04N 17/00
[52] U.S. Cl. ...................... 358/86; 358/139; 358/21 V; 358/145; 328/188
[58] Field of Search .............. 358/139, 21 V, 86, 145; 328/187, 188

[56] References Cited

U.S. PATENT DOCUMENTS

| | | | |
|---|---|---|---|
| 2,733,433 | 1/1956 | Morrison | 358/139 |
| 3,651,403 | 3/1972 | Fluck, Jr. | 358/139 |
| 3,879,749 | 4/1975 | Baum | 358/139 |
| 3,978,282 | 8/1976 | Fulton | 178/69 G |
| 4,078,245 | 3/1978 | Johnson et al. | 358/86 |
| 4,207,431 | 6/1980 | McVoy | 358/86 |
| 4,408,227 | 10/1983 | Bradley | 358/139 |

Primary Examiner—Howard W. Britton
Assistant Examiner—John K. Peng
Attorney, Agent, or Firm—Flehr, Hohbach, Test, Albritton & Herbert

[57] ABSTRACT

Apparatus and method for testing the frequency response of a cable television system by transmitting a test signal of varying frequency over the system. The test signal is transmitted during the blanking intervals between successive frames or lines of the television pictures and at a level comparable to the level of the video signals which carry the information for the pictures.

31 Claims, 2 Drawing Figures

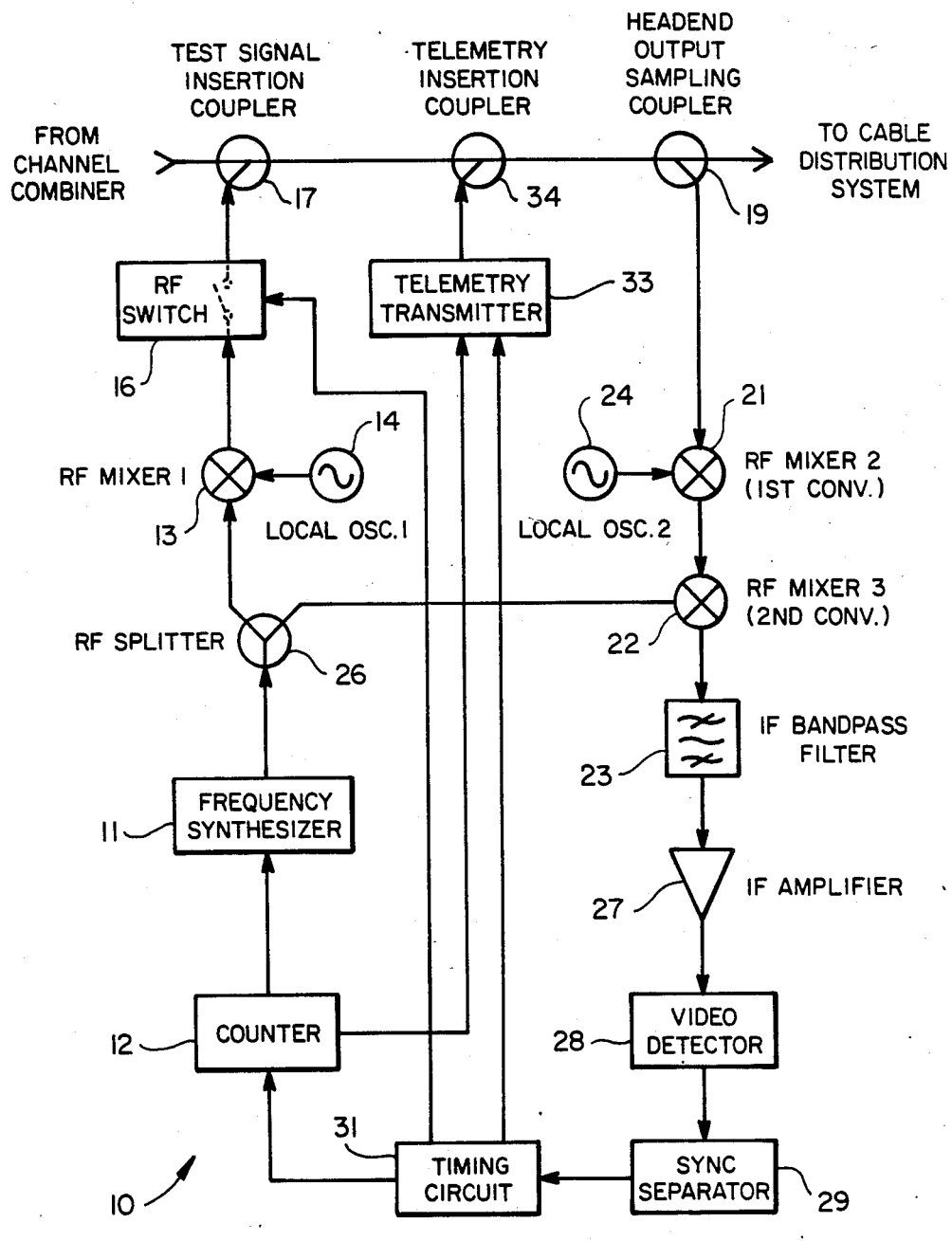
FIG_1

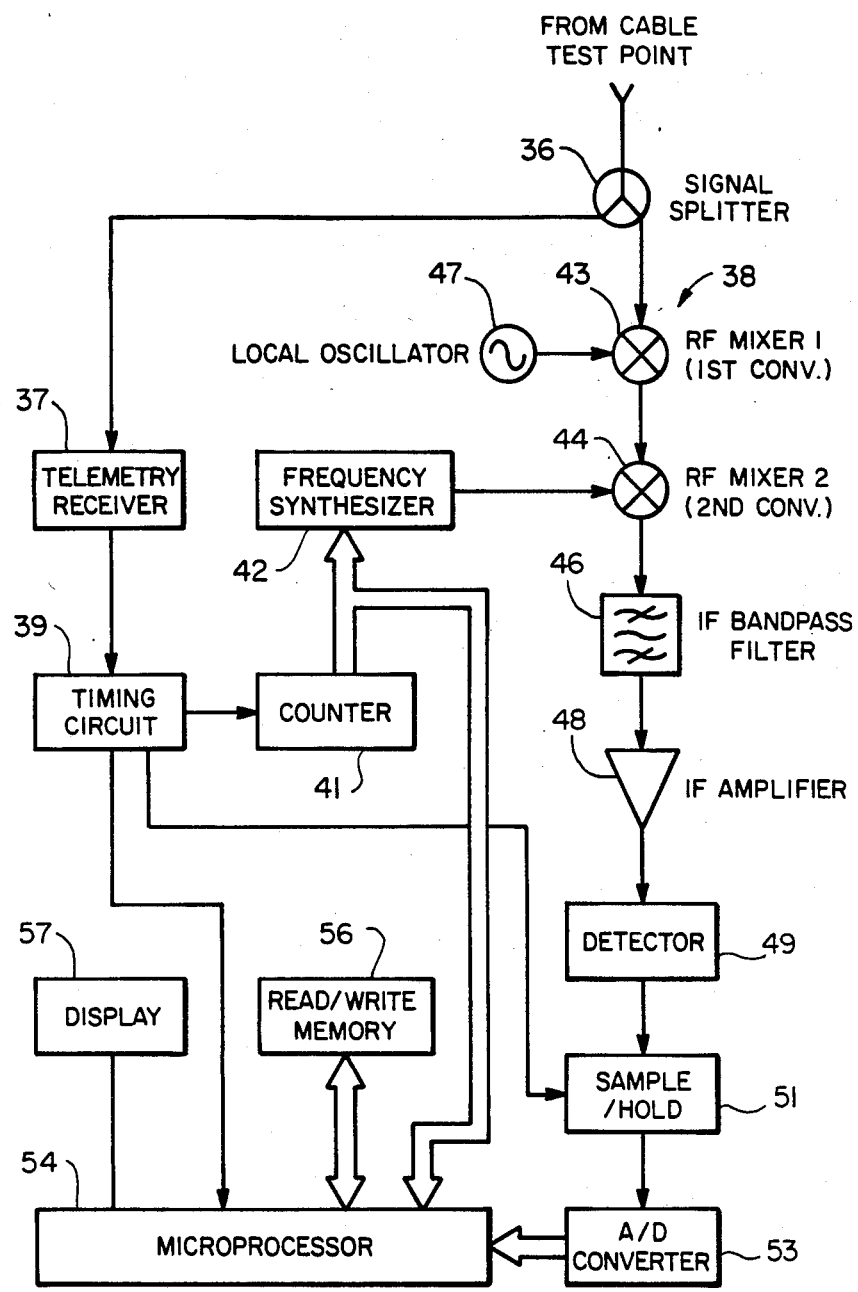
FIG_2

APPARATUS AND METHOD OF TESTING THE FREQUENCY RESPONSE OF A CABLE TELEVISION SYSTEM

This invention pertains generally to cable television systems, and more particularly to apparatus and a method for testing the frequency response of a cable television system.

In a cable television system, signals for a plurality of different television channels are transmitted over a network of cables to the television receivers of subscribers. The signals cover a wide spectrum of frequencies, and in order to assure good signal quality for all of the channels, the network must be maintained in proper operating condition over the entire frequency spectrum. This requires frequent monitoring of the frequency response of the system.

One method heretofore employed for testing the frequency response of a cable television system is to sweep a signal of relatively high power level across the entire frequency range of the system. This signal typically has a power level on the order of 10–100 times the power level of the highest television signal on the system. This high level signal has the advantage of permitting the use of relatively simple receiving equipment to monitor the performance of the system, but it interferes blatantly with the transmission of the television signals and produces interference which is visible on the screens of the subscribers' television receivers. This interference can be reduced to some extent by using a very fast sweep time (e.g., 1 ms) and a slow repetition cycle (e.g., 3–4 secs) for the test signal. The fast sweep and slow repetition rates make it more difficult to align the system, and a compromise must be reached between the interference to be tolerated by the subscribers and the needs of the alignment crews. Also, the high level test signal can overload amplifiers in the system, further interfering with the transmission of the video signals and making proper system alignment impossible.

U.S. Pat. No. 3,978,282 describes a system in which interference is reduced by keeping the test signal about 30–40 db below the level of the video carriers. The test signal is received with a relatively narrow band spectrum analyzer which is tracked with the test signal generator. While this low level approach does reduce the visible interference to some extent, it still has certain limitations and disadvantages, and the interference may still be visible to a degree which some subscribers may find annoying. If the test signal is lowered below the video carriers to a level which is truly non-interfering, the received signal tends to be noisy, and measurement resolution is poor. Moreover, since the test signal is below the levels of all other signals in the system, measurements of amplitude response are masked over a significant portion of the system band width.

It is in general an object of the invention to provide a new and improved apparatus and method for testing the frequency response of cable television systems.

Another object of the invention is to provide an apparatus and method of the above character which overcome the limitations and disadvantages of systems heretofore employed for testing cable television systems.

These and other objects are achieved in accordance with the invention by transmitting a test signal over a cable television system during a blanking interval between the frames or lines of a television picture. The signal is transmitted at a level comparable with the level of the video signals and is easily monitored without interference with the video signals. The frequency of the test signal is varied across the band width of the system, either continuously or in discrete steps, and the monitoring equipment is tuned in synchronization with the test signal generator to the frequency of the test signal.

FIG. 1 is a block diagram of one embodiment of apparatus for applying a test signal to a cable television system in accordance with the invention.

FIG. 2 is a block diagram of one embodiment of apparatus for monitoring the response of the cable television system to the test signal provided by the apparatus of FIG. 1.

Television signals are transmitted over a cable network at different frequencies for different channels, with the signals for each channel being transmitted in a conventional format such as the NTSC signal. The picture is displayed in discrete segments by scanning the screen of a cathode ray tube in raster fashion with an electron beam modulated in accordance with the picture information carried by the video signals. In the NTSC format, the picture is scanned at a rate of 30 frames per second with 525 horizontally extending lines per frame. Each frame is composed of two interlaced half frames, called fields, occurring at a rate of 60 fields per second with $262\frac{1}{2}$ lines per half frame. The times at which the scan lines are displayed are controlled by synchronization pulses, and the beam is turned off during retrace or blanking intervals between the successive segments of the picture, i.e. scan lines and fields.

In FIG. 1, the inventron is illustrated in connection with a portion of the distribution network of a cable television system 10 in which the combined signals for a plurality of television channels are present. As illustrated in this figure, the apparatus which provides the test signal includes a frequency synthesizer 11 which generates an output signal which varies in frequency in discrete steps as controlled by a counter 12. The output signal from the synthesizer is converted to the desired range of frequencies for insertion into the cable network by a mixer 13 and a local oscillator 14. The operating frequencies of the synthesizer and the local oscillator are chosen such that as the synthesizer steps through its range, the output signal from the mixer covers the full frequency range of the distribution system with the degree of resolution (i.e., individual frequency steps) desired. The output signal from mixer 13 is applied to the cable network by an RF switch 16 and an insertion coupler 17.

Although in this particular embodiment, the frequency of the test signal varies in discrete steps, a signal which sweeps continuously across the spectrum of the distribution system can be employed, if desired.

A sample of the output signal from the channel combining network of the cable system is obtained from the network by a sampling coupler 19 and fed through mixers 21 and 22 to an IF bandpass filter 23. An injection signal for mixer 21 is provided by a local oscillator 24, and an injection signal for mixer 22 is obtained from the output of frequency synthesizer 11 via a signal splitter 26. The frequency of local oscillator 24 is chosen such that when the test signal is at its highest frequency in any given channel, the video carrier of the next higher channel is centered in the bandpass of filter 23. The signal passed by filter 23 is amplified by an IF amplifier 27 and demodulated by a video detector 28. A sync separator circuit 29 separates the horizontal and vertical synchronization pulses from the video signal and applies these pulses to a timing circuit 31.

The timing circuit provides clocked pulses to counter 12 for the purpose of incrementing the test frequency. Whenever a video signal is received and demodulated, the timing circuit inhibits the production of clock pulses until the video signal for the next channel is in a time period such that the television receivers tuned to that channel are normally blanked. The timing circuit also provides control pulses to RF switch 16 so that the test signal is only present in the cable network when it will not interfere with television reception on the channel being tested.

A telemetry transmitter 33 generates a separate signal which is applied to the cable network by an insertion coupler 34 and transmitted in a portion of the spectrum which is not used for television signals. The information carried by this signal is utilized in synchronizing the tuning of the monitoring equipment with the generation of the test signal. Synchronizing signals for the telemetry transmitter are provided by timing circuit 31 and counter 12.

The level of the test signal applied to the cable network by coupler 17 is comparable to the level of the video signals transmitted by the network. The exact level of the test signal is not critical. Test signals having levels greater than the video signal levels can be utilized during the vertical blanking interval of the video signal as long as they do not produce nonlinearities in the amplifying circuits of the network. Test signals introduced during the horizontal blanking interval may actuate the automatic gain control circuits in some television receivers if they exceed the level of the video signals. Accordingly, if the test signals are present during horizontal blanking, they are preferably maintained at or below the level of the video signals. Levels as low as about 20 db below video levels can be used and still provide a significant improvement over the low-level technique described in U.S. Pat. No. 3,978,282 where the test signal level is 30–40 db below the video level. Transmitting the test signal at a level 20 db below the video carrier level has the additional advantage of avoiding any possible interference with the audio carriers which are typically about 15 db below the video carrier levels.

The functions of timing circuit 31 and counter 12 can be performed by a microprocessor which can be programmed to control the output of synthesizer 11 in any desired manner. The processor can enhance the performance of the system, for example, by avoiding certain critical frequencies or accommodating non-standard video channel spacings.

As illustrated in FIG. 2, signals from a test point in the cable are split by a signal splitter 36, with portions of the signals going to a telemetry receiver 37 and a test signal receiver 38.

Telemetry receiver 37 recovers the synchronization information transmitted by telemetry transmitter 33 and delivers this information to a timing circuit 39. This timing circuit is generally similar to timing circuit 31, and it serves to keep a counter 41 and a frequency synthesizer 42 in synchronization with counter 12 and synthesizer 11.

Test signal receiver 38 is illustrated as a double conversion receiver having mixers 43, 44 which convert the incoming signal so that the frequency of the test signal is centered in the pass band of a bandpass filter 46. Injection signals for the mixers are provided by a local oscillator 47 and by frequency synthesizer 42. The output signal from filter 46 is amplified by an IF amplifier 48 and demodulated by a detector 49.

The output of detector 49 is connected to the input of a sample and hold circuit 51 which also receives an input from timing circuit 39. The sample and hold circuit stores the output of the detector when the test signal is present. The signal stored in the sample and hold circuit is converted to digital form by an analog to digital converter 53.

The test signal data is read from A/D converter 53 by a microprocessor 54 and stored in a read/write memory 56. The output of counter 41 is sampled by the processor and utilized as an index to determine the memory location in which the data for a particular test signal is stored.

The contents of memory 56 are periodically read and displayed by a display 57 which can be a cathode ray tube or flat panel display, a printer or any other suitable output device.

Rather than using the microprocessor and related components to display the response of the cable network to the test signal, any other suitable output technique can be employed. For example, the output of counter 41 can be converted to an analog signal, and that signal and the output of sample and hold circuit 51 can be applied directly to the inputs of an X-Y display device such as an oscilloscope or a plotter.

The invention has a number of important features and advantages. The test signal can be transmitted during either a horizontal blanking interval or a vertical blanking interval for the channel under test, where it does not produce any visible interference on the screens of television receivers tuned to that channel. The signal is transmitted at a level which is readily received to monitor the response of the cable network to the signal.

In addition, during the horizontal and vertical blanking intervals, the spectrum of the transmitted video signal has less sideband energy to interfere with measurements than during the active portion of the picture line.

It is apparent from the foregoing that a new and improved apparatus and method for testing the frequency response of cable television systems have been provided. While only certain presently preferred embodiments have been described in detail, as will be apparent to those familiar with the art, certain changes and modifications can be made without departing from the scope of the invention as defined by the following claims.

We claim:

1. In apparatus for testing the frequency response of a cable television system in which program signals including video signals for different channels are transmitted in different frequency ranges and pictures for the different channels are displayed in segments with blanking intervals between successive ones of the segments: means for generating a test signal within the frequency range of one of the channels, means for applying the test signal to the cable television system for transmission over the system in one of the blanking intervals between the picture segments such that the test signal does not produce interference which is visible in the display of the picture, a receiver connected to the cable system and having means of limited bandwidth for selectively passing the test signal but not the video signals, and means for monitoring the signal passed by the receiver to determine the response of the cable television system to the test signal without interruption of the video signals for any of the channels.

2. The apparatus of claim 1 wherein the test signal is applied to the system at a level on the order of the level of the video signals carried by the system.

3. The apparatus of claim 1 including means for varying the frequency of the test signal.

4. The apparatus of claim 3 wherein the frequency of the test signal is varied in discrete steps.

5. The apparatus of claim 3 wherein the frequency of the test signal is varied continuously.

6. The apparatus of claim 1 wherein the picture is displayed in discrete fields each comprising a plurality of discrete scan lines, and the test signal is transmitted during a blanking interval between successive ones of the picture fields.

7. The apparatus of claim 1 wherein the picture is displayed in discrete frames each comprising a plurality of discrete scan lines, and the test signal is transmitted during a blanking interval between successive ones of the scan lines.

8. The apparatus of claim 1 including means for varying the frequency of the test signal, means for tuning the receiver to selectively pass signals of different frequencies, and means for synchronizing the tuning of the receiver with the frequency of the test signal.

9. In a method for testing the frequency response of a cable television system in which program signals including video signals for different channels are transmitted at different frequencies and pictures for the different channels are displayed in segments with blanking intervals between successive ones of the segments, the steps of: generating a test signal within the frequency range of one of the channels, applying the test signal to the cable television system for transmission over the system in one of the blanking intervals between the picture segments such that the test signal does not produce interference which is visible in the display of the picture, and monitoring the response of the cable television system to the test signal without interruption of any of the video signals by means of a receiver having means of limited bandwidth which passes the test signal but not the video signals.

10. The method of claim 9 wherein the test signal is applied to the system at a level on the order of the level of the video signals carried by the system.

11. The method of claim 9 including the step of varying the frequency of the test signal.

12. The method of claim 11 wherein the frequency of the test signal is varied in discrete steps.

13. The method of claim 11 wherein the frequency of the test signal is varied continuously.

14. The method of claim 9 wherein the picture is displayed in discrete fields each comprising a plurality of discrete scan lines, and the test signal is transmitted during a blanking interval between successive ones of the picture fields.

15. The method of claim 9 wherein the picture is displayed in discrete frames each comprising a plurality of discrete scan lines, and the test signal is transmitted during a blanking interval between successive ones of the scan lines.

16. The method of claim 9 including the steps of varying the frequency of the test signal, tuning the receiver to selectively pass signals of different frequencies, and synchronizing the tuning of the receiver with the frequency of the test signal.

17. In apparatus for testing the frequency response of a cable television system which carries video signals for pictures displayed in discrete fields each comprising a plurality of discrete scan lines with blanking intervals between successive ones of the scan lines: means for applying a test signal to the cable television system for transmission over the system in one of the blanking intervals between successive ones of the scan lines so that the test signal does not produce interference which is visible in the display of the picture, and means for monitoring the response of the cable television system to the test signal.

18. In a method for testing the frequency response of a cable television system which carries video signals for pictures displayed in discrete frames each comprising a plurality of discrete scan lines with blanking intervals between successive ones of the scan lines, the steps of: applying a test signal to the cable television system for transmission over the system in one of the blanking intervals between successive ones of the scan lines such that the test signal does not produce interference which is visible in the display of the picture, and monitoring the response of the cable television system to the test signal.

19. In apparatus for testing the frequency response of a cable television system in which video signals for different channels are transmitted in different frequency bands and pictures for the different channels are displayed in segments with blanking intervals between successive ones of the segments: means for generating a test signal at a frequency which can be varied over the frequency bands for the different channels, means active when the test signal is at a predetermined frequency in one of the bands for monitoring the video signal for the next channel to be tested to obtain a synchronization signal which defines a blanking interval for the next channel, means responsive to the synchronization signal for applying the test signal for the next channel to the cable system only during the blanking interval for the next channel, and means for monitoring the reaction of the cable system to the test signal.

20. The apparatus of claim 19 including means for varying the frequency of the test signal in discrete steps.

21. The apparatus of claim 19 including means for varying the frequency of the test signal continuously.

22. The apparatus of claim 19 wherein the predetermined test signal frequency during which the video signal for the next channel is monitored is the last frequency to be tested in the preceding channel.

23. The apparatus of claim 19 wherein the test signal is applied to the system at a level on the order of the video signals.

24. The apparatus of claim 19 wherein the picture for each channel is displayed in discrete fields each comprising a plurality of discrete scan lines, and the test signal is transmitted during a blanking interval between successive ones of the picture fields.

25. The apparatus of claim 19 wherein the picture for each channel is displayed in discrete frames each comprising a plurality of discrete scan lines, and the test signal is transmitted during a blanking interval between successive ones of the scan lines.

26. In a method for testing the frequency response of a cable television system in which video signals for different channels are transmitted in different frequency bands and pictures for the different channels are displayed in segments with blanking intervals between successive ones of the segments: generating a test signal at a frequency which can be varied over the frequency bands of the different channels, monitoring the video signal for the next channel to be tested while the test signal is at a predetermined frequency in the preceding channel to obtain a synchronization signal which defines a blanking interval for the next channel, applying the test signal for the next channel to the cable system only during the blanking interval for the next channel, and monitoring the reaction of the cable system to the test signal.

27. The method of claim 26 wherein the test signal is applied to the system at a level on the order of the level of the video signals carried by the system.

28. The method of claim 26 wherein the frequency of the test signal is varied in discrete steps.

29. The method of claim 26 wherein the frequency of the test signal is varied continuously.

30. The method of claim 26 wherein the picture for each channel is displayed in discrete fields each comprising a plurality of discrete scan lines, and the test signal is transmitted during a blanking interval between successive ones of the picture fields.

31. The method of claim 26 wherein the picture for each channel is displayed in discrete frames each comprising a plurality of discrete scan lines, and the test signal is transmitted during a blanking interval between successive ones of the scan lines.

* * * * *